United States Patent [19]

Kureha et al.

[11] 4,414,571
[45] Nov. 8, 1983

[54] TELEVISION RECEIVER

[75] Inventors: Takeshi Kureha, Yawata; Teruo Kataoka, Sakai; Taiichi Saeki, Katano; Minoru Takeda, Hirakata, all of Japan

[73] Assignee: Matsushita Electric Industrial Co., Ltd., Osaka, Japan

[21] Appl. No.: 309,850

[22] Filed: Oct. 8, 1981

[30] Foreign Application Priority Data

| Oct. 9, 1980 [JP] | Japan | 55-141201 |
| Oct. 9, 1980 [JP] | Japan | 55-141202 |
| Oct. 9, 1980 [JP] | Japan | 55-141203 |
| Oct. 9, 1980 [JP] | Japan | 55-141204 |
| Oct. 9, 1980 [JP] | Japan | 55-141205 |

[51] Int. Cl.$^3$ .............................. H04N 5/04
[52] U.S. Cl. .................... 358/158; 358/22
[58] Field of Search .............. 358/11, 22, 148, 158, 358/150, 153, 182, 183

[56] References Cited

U.S. PATENT DOCUMENTS

| 4,264,919 | 4/1981 | Abbott | 358/11 |
| 4,286,283 | 8/1981 | Clemens | 358/11 |
| 4,298,890 | 11/1981 | Lai | 358/158 |

OTHER PUBLICATIONS

Dill, "High Resolution NTSC Television System", Oct. 78, IBM Technical Disclosure Bulletin, vol. 21, #5, pp. 2148-2153.

Primary Examiner—Michael A. Masinick
Attorney, Agent, or Firm—Stevens, Davis, Miller & Mosher

[57] ABSTRACT

A television receiver converts a television signal of a standard television system currently employed into a signal at a horizontal scanning frequency of n (an integer of 2 or more) times that of the original television signal, so that it can visually reproduce any one of a television signal of the standard television system and a television signal of a second television system, which has a horizontal scanning frequency of about n times that of the television signal of the standard television system. When receiving the television signal of the standard television system, the horizontal deflection circuit operates at a horizontal scanning frequency n times that of the standard television system. When receiving the television signal of the second television system, it operates at the horizontal scanning frequency of the second television system. For the reproduction of the converted signal with the n times horizontal scanning frequency, the interval between the adjacent scanning lines may properly be adjusted by moving them at the horizontal scanning period of the standard television system in the vertical scanning direction.

10 Claims, 17 Drawing Figures

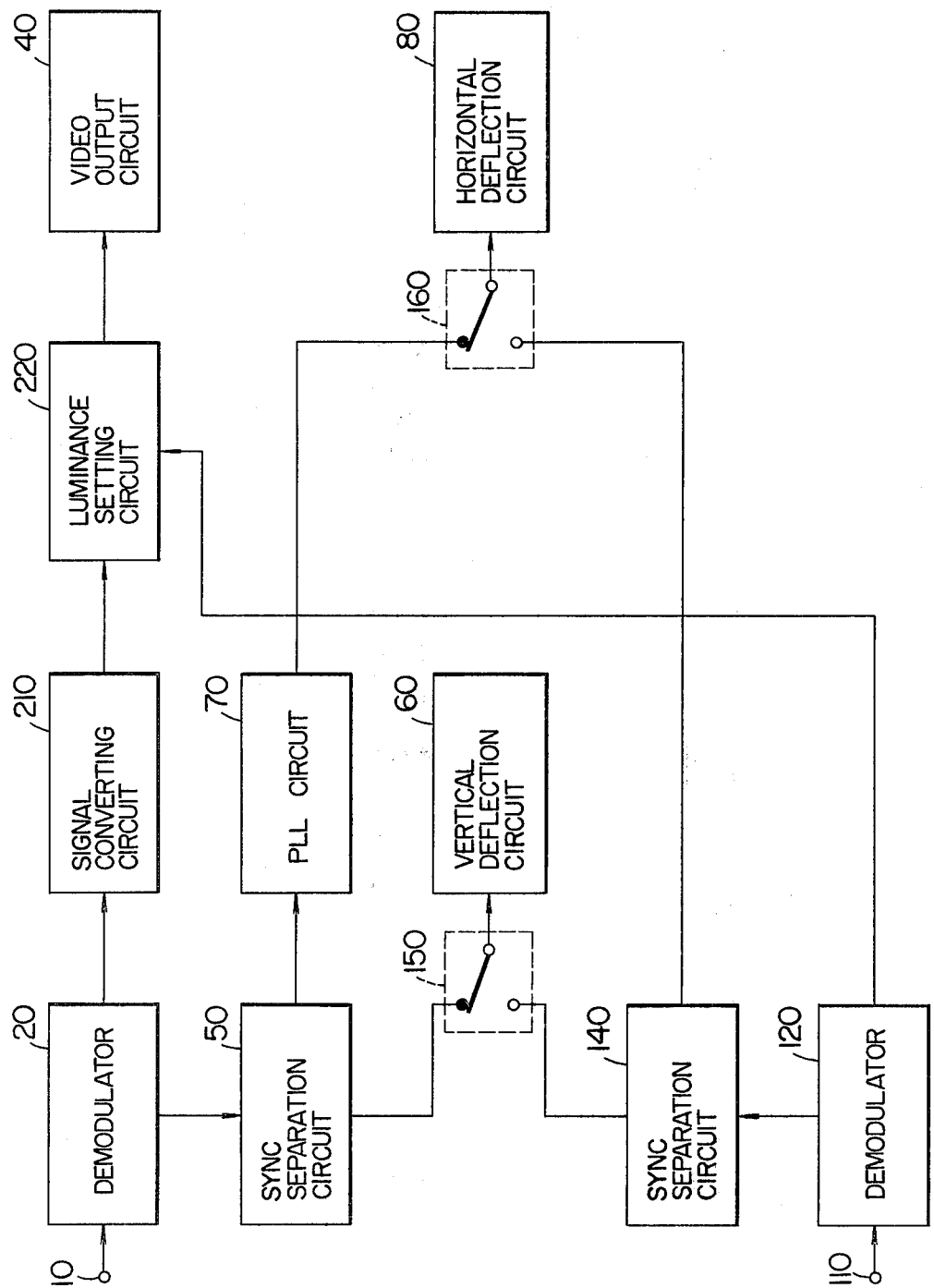

FIG. 11
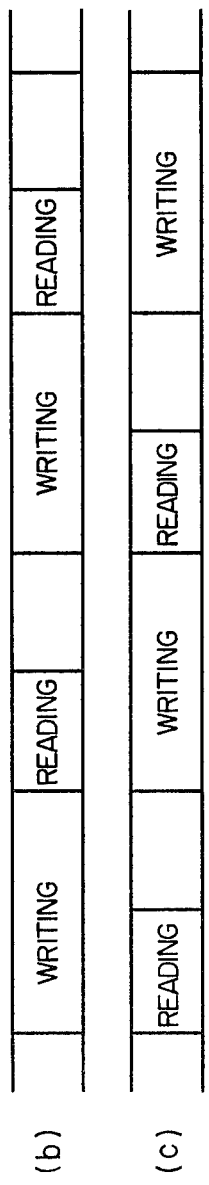
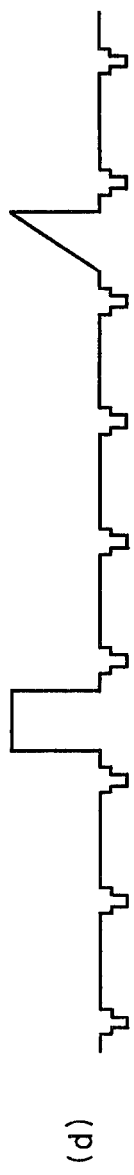

TELEVISION RECEIVER

BACKGROUND OF THE INVENTION

The present invention relates to a compatible television receiver which can visually reproduce a television signal of a standard television system and a television signal of a second television system having a horizontal scanning frequency n times that of the television signal of the standard television system.

The standard television systems now employed are typically an NTSC system, a PAL system, and a SECAM system. In the NTSC system, for example, the number of the horizontal scanning lines is 525 and the number of frames per second is 30. In an enlarged picture size of the recent television set of any system, the scanning line intervals are widened and distinctive on the screen, thus providing a coarse picture. Particularly in present times a large sized picture is often required and the development of a high resolution picture television signal is urgently required for improving the poor resolution in the television picture. For this reason, a high definition television system (HDTV) having a number of the scanning lines two to three times that of the currently used standard television system and with a frequency band-width 5 to 10 times that of the standard television system, will be employed in the near future. The HDTV already proposed by NHK (Nippon hoso kyokay, the Japanese national broadcasting corporation) has 1125 scanning lines and a 20 MHz luminance band-width. The HDTV processed by the EIA(Electronic Industries Association) has 1023 scanning lines and a 21.1 MHz luminance band-width. The HDTV proposed by the BBC has 1501 scanning lines and a 50 MHz luminance band-width.

Those HDTVs are now being discussed by a working group in SMPTE (Society of Motion Picture and Technical Engineers), which has been specially set up for the realization and execution of HDTV. It is believed that the realization of a HDTV television set, which can also be adaptable for the standard television system, that is, a compatible television set, will promote the prevalence of the HDTV, particularly in a transition present transient period to the HDTV days.

In recent times, there has been an increasing demand for character display systems for displaying alphanumeric characters, symbols and the like, which are used in the terminal equipment of the computer, and a graphic display for displaying graphs, patterns and the like. In some display devices of this type, in order to improve the amount of information handled, the luminance signal band-width is widened and the number of scanning lines is increased to about two times that of the standard television system. If those display devices are so designed as to visually reproduce a television signal of the standard television system, the display device can display the signals from VTR or cameras, thus finding a wide use. In this respect, it is desired to realize such compatible display devices as soon as possible.

In realizing compatible television receivers, a problem is encountered in that it is difficult to use a deflection circuit common for two the television systems for their signal processing, since the horizontal scanning frequencies of the two television systems are greatly different from each other.

Two methods to cope with this problem have been known. One of those methods is the horizontal deflection circuit is partially switched by means of a relay or the like so that it operates at the scanning frequency of either the standard television system or the second television system. The method, however, has a drawback of insufficiency in reliability, since relay means must switch-over circuit constants of a high potential circuit portion such as a resonance capacitor, an S distortion correcting capacitor, and a linearity control coil.

The second method is that, as in the standard television system converting method between the NTSC, PAL and SECAM system, a video signal of one television system is converted into a signal with a horizontal scanning frequency of the other television system, and the operating frequency of the deflection circuit is fixed to the scanning frequency of the other television system.

However, the second method requires a frame memory and yet a large memory capacity. Furthermore, this method is applicable only for the conversion between two television systems of which the scanning frequencies are in a fixed relation. In this respect, this method has a poor flexibility in converting the television signals of the television systems one to another.

SUMMARY OF THE INVENTION

Accordingly, an object of the present invention is to provide a simple and reliable television receiver which can visually reproduce a television signal of a standard television system and a television signal of a second television system with a horizontal scanning frequency about n times that of the signal of the standard television system.

Another object of the present invention is to provide a means for adjusting an arrangement or distribution of scanning lines and signals when the television signal of the standard television system is converted to be displayed by a converted signal with a horizontal scanning frequency n times that of the television signal of the standard television system.

BRIEF DESCRIPTION OF THE DRAWINGS

FIG. 10 is a further embodiment of a television receiver according to the present invention.

FIG. 11 shows a set of waveforms useful in explaining the operation of a signal converting circuit shown in FIG. 10.

DESCRIPTION OF THE PREFERRED EMBODIMENT

Figure 1:
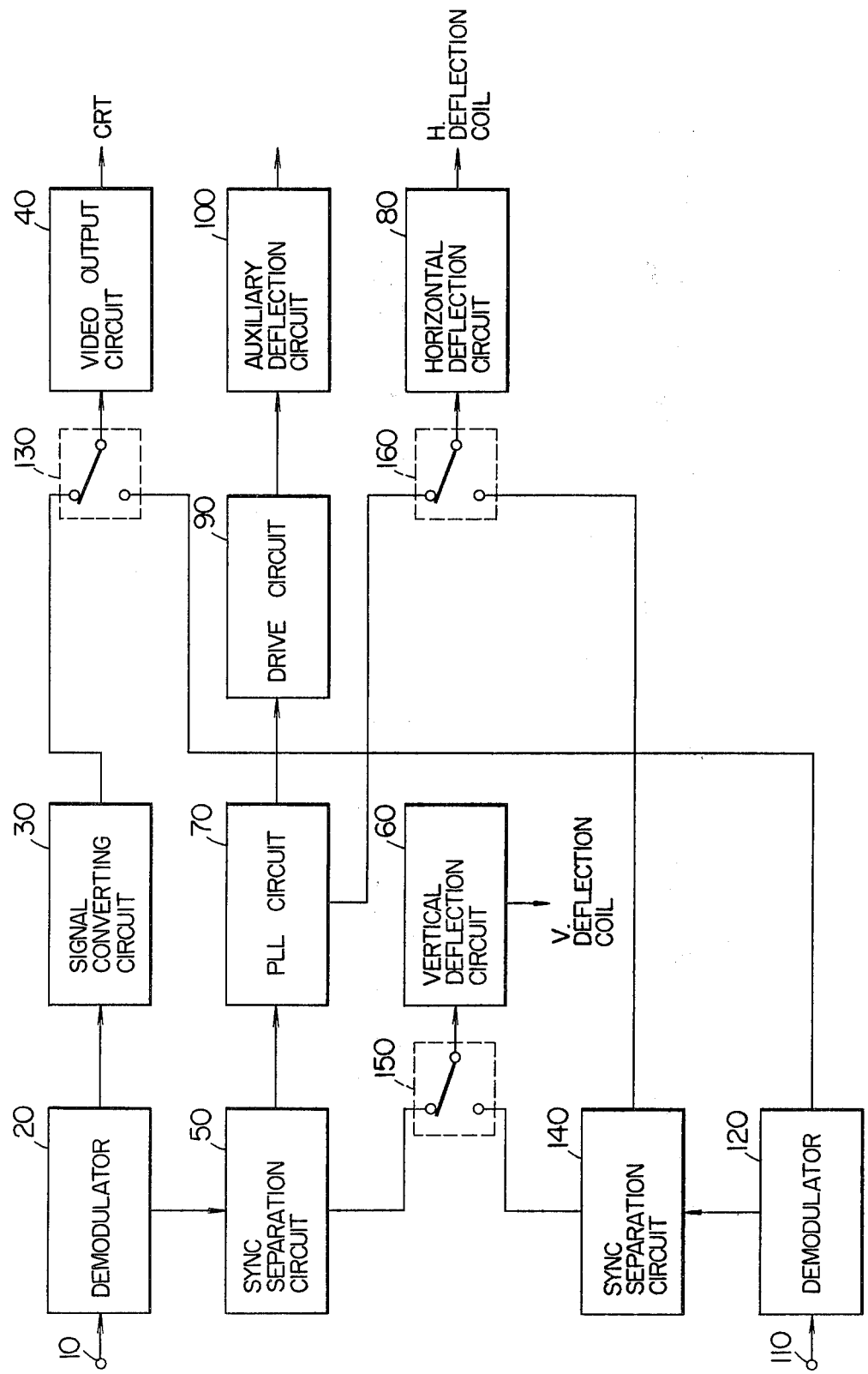
FIG. 1 shows a block diagram of an embodiment of a television receiver according to the present invention.

A block diagram of an embodiment of a television receiver according to the present invention is shown in FIG. 1. In FIG. 1, reference numeral 10 designates an input terminal, numeral 20 a demodulator, 30 a signal converting circuit, 40 a video output circuit, 50 a sync separation circuit, 60 a vertical deflection circuit, 70 a PLL circuit, 80 a horizontal deflection circuit, 90 a drive circuit, 100 an auxiliary deflection means, 110 an input terminal, 120 a demodulator, 130 a changeover switch, 140 a sync separation circuit, 150 a changeover switch, and 160 a changeover switch. The input terminal 10 is supplied with a television signal of a standard television system (a video signal of the NTSC system in this embodiment). The demodulator 20, widely used in a usual television receiver, demodulates the video signal into signals corresponding to primary colors, for example, R, G and B signals or Y, I and Q signals. In this embodiment, a case that the television signal is demodulated into R, G and B signals is illustrated. These signals are applied to the signal converting circuit 30, and after converted into a signal with a doubled horizontal scanning frequency, the signals are amplified by the video output circuit 40. Then, those signals are applied to a CRT (cathode ray tube) (not shown).

Figure 2:
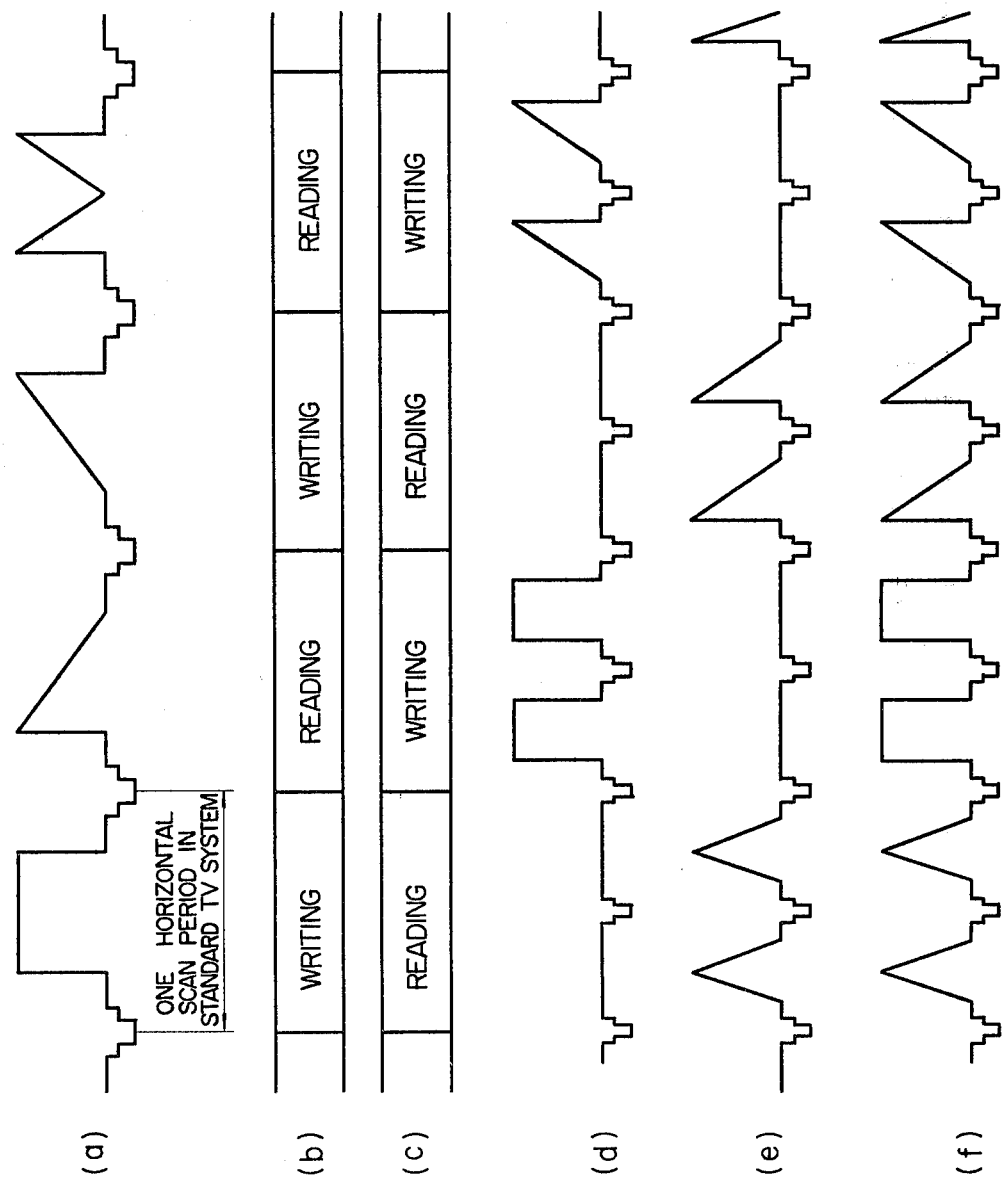
FIG. 2 shows a set of waveforms useful in explaining the operation of a signal converting circuit shown in FIG. 1.

The operation of an embodiment of the signal converting circuit 30 will be described referring to FIG. 2. FIG. 2(a) indicates an example of a signal obtained by the demodulator 20, and the signal is applied to the signal converting circuit 30. The signal converting circuit 30 has at least two memories. As shown in FIGS. 2(b) and (c), the circuit is so arranged that when one memory is in a write mode, the other is in a read out mode. The operation modes are inverted every horizontal scanning period of a television signal of the standard television system. The written signal is read out twice at a speed two times as fast as that at which it is written during the next one horizontal scanning period. Therefore, a signal shown in FIG. 2(d) is read out from the memory of which the operation mode is shown in FIG. 2(b), and a signal shown in FIG. 2(e) is read out from the memory of which the operation mode is shown in FIG. 2(c). A composite signal (f) of the signals (d) and (e) summed with each other is taken out as an output signal of the signal converting circuit 30.

The sync separation circuit 50, widely used in a usual television receiver, separates a horizontal synchronizing signal and a vertical synchronizing signal from a sync signal obtained by the demodulator 20. The vertical synchronizing signal is supplied to the vertical deflection circuit 60 by way of the switch 150. The vertical deflection circuit 60 drives a vertical deflection coil (not shown). Meanwhile, the horizontal synchronizing signal is supplied to the PLL circuit 70. The PLL circuit 70 forms a frequency twice that of the horizontal synchronizing signal on the basis of the horizontal synchronizing signal supplied from the sync separation circuit 50. The signal formed is supplied to the horizontal deflection circuit 80 via the switch 160. The PLL circuit 70 also produces a square wave with a duty ratio 50% and the same frequency as that of the horizontal synchronizing signal on the basis of the horizontal synchronizing signal supplied from the sync separation circuit 50, and supplies it to the drive circuit 90.

Figure 3:
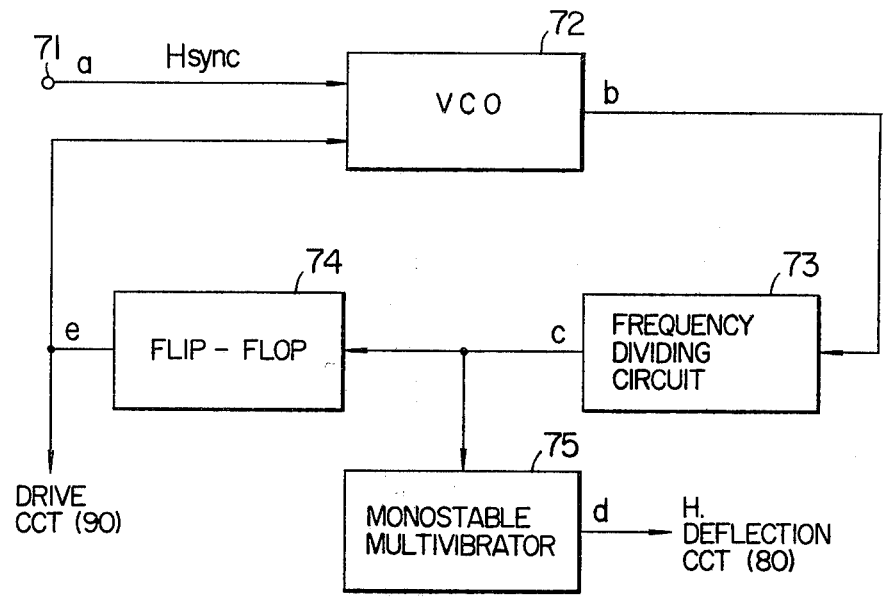
FIG. 3 shows a block diagram of an example of a PLL circuit shwon in FIG. 1.
Figure 4:
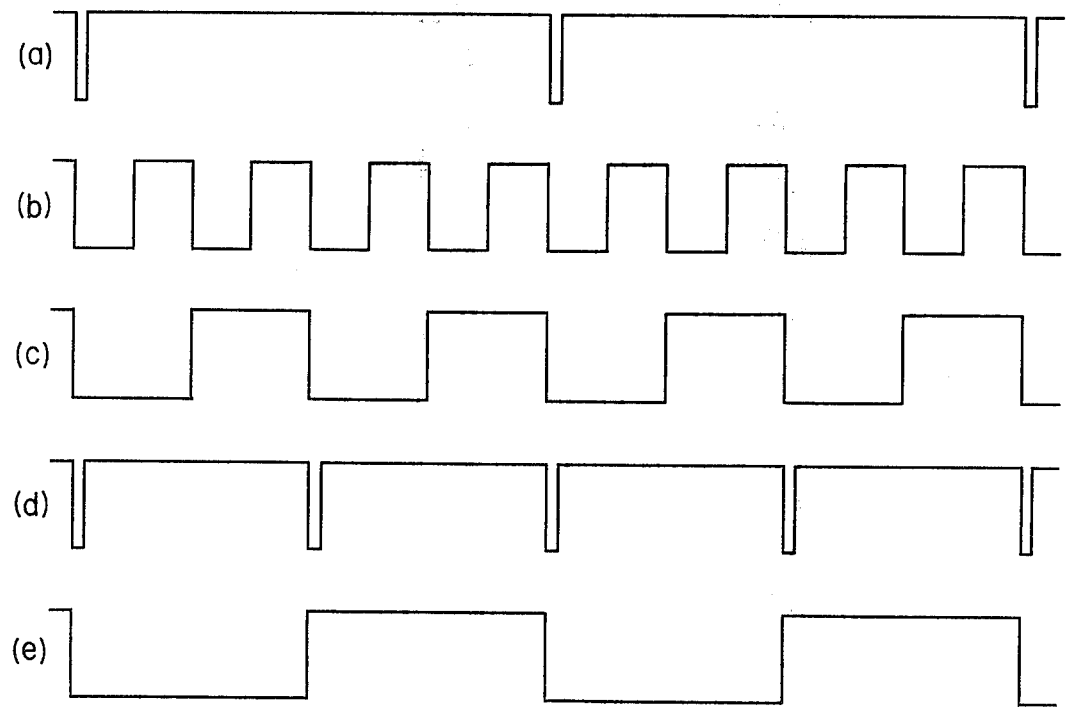
FIG. 4 shows a set of waveforms useful in explaining the operation of the PLL circuit shown in FIG. 3.

An embodiment of the PLL circuit 70 and a waveform diagram for the explanation of the circuit 70 are shown in FIGS. 3 and 4. In FIG. 3, reference numeral 71 designates an input terminal, 72 a voltage controlled oscillator (VCO), 73 a frequency dividing circuit, 74 a flip-flop, and 75 a monostable multivibrator. In FIG. 4, there are illustrated a waveform (a) of a horizontal synchronizing signal supplied from the sync separation circuit 50 in FIG. 1 to the input terminal 71, a waveform (b) of an output signal of the VCO 72, a waveform (c) of an output signal of the frequency dividing circuit 73, a waveform (d) of an output signal of the monostable multivibrator 74 and a waveform (e) of an output signal of the flip-flop. The VCO 72 generates a signal at a frequency m (m is an integer of 2 or more) times that of the horizontal sync signal applied to the input terminal 71 (in this embodiment, m=4). The output signal from the VCO 72 is fed to the frequency dividing circuit 73. The frequency dividing circuit 73 frequency-divides the output signal of the VCO 72 into a signal with a 2/m frequency, as shown in FIG. 4(c), and feeds it to the flip-flop 74 and the monostable multivibrator 75. The monostable multivibrator 75 properly sets a pulse width on the basis of the signal in FIG. 4(c) supplied from the frequency dividing circuit 73, to reproduce a horizontal sync signal as shown in FIG. 4(d). The frequency of the horizontal sync signal obtained in the monostable multivibrator 75 is twice as high as that of the horizontal sync signal, shown in FIG. 4(a), applied to the input terminal 71. And the signal is fed to the horizontal deflection circuit 80 through the switch 160. Meanwhile, the output of the frequency dividing circuit 73 is also supplied to the flip-flop 74. The flip-flop 74 frequency divides the output signal of the frequency dividing circuit 73 to a signal with a halved frequency, and obtains a signal having a waveform shown in FIG. 4(e) and feeds it to the VCO 72. The VCO 72 compares the signal from the input terminal 71 with the signal from the flip-flop 74, and controls an oscillation frequency to be m times as high as the input frequency. Further, the output of the flip-flop 74 with a square wave having a duty ratio 50% as shown in FIG. 4(e), is supplied to the VCO 72 and the drive circuit 90.

As described above, the PLL circuit 70 supplies the signal to the horizontal deflection circuit 80 and the drive circuit 90. The horizontal sync signal fed to the horizontal deflection circuit 80 has a frequency n times that of the horizontal sync signal contained in the television signal of the standard television system applied to the input terminal 10. Therefore, the horizontal deflection circuit 80 drives a horizontal deflection coil (not shown) at a horizontal scanning frequency two times that of the television signal of the standard television system. Further, the horizontal deflection circuit 80 is so designed that it operates at a frequency substantially n times as high as that of the television signal of the standard television system.

Figure 5A:
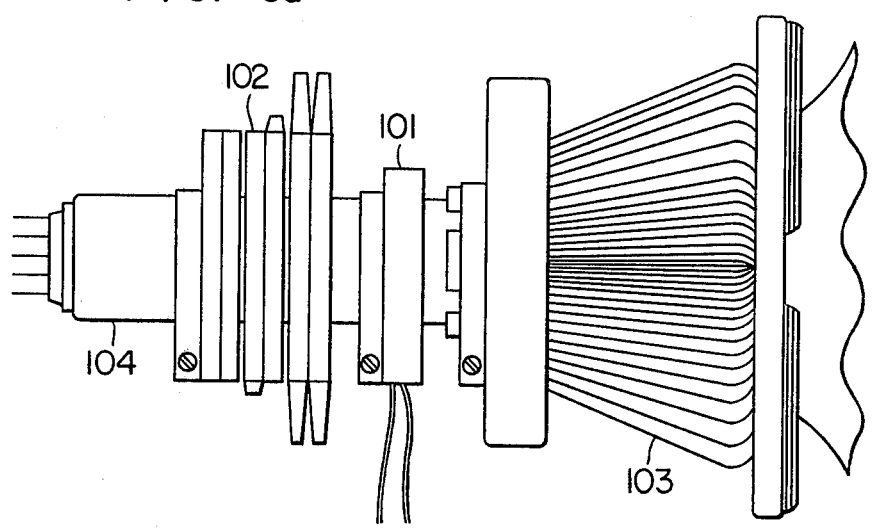
FIGS. 5a and 5b are schematic diagrams of an auxiliary deflection means shown in FIG. 1.
Figure 5B:
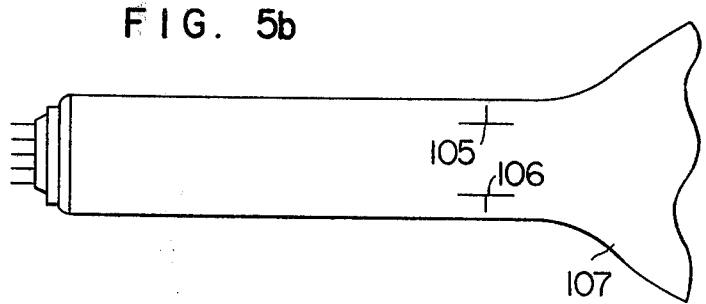

Next, the drive circuit 90 adjusts an amplitude of a square wave with a duty ratio 50% formed by the PLL circuit 70 into an optimum value to be described later, and drives the auxiliary deflection means 100. The arrangement of the drive circuit 90 is the same as that of a usual amplifier and does not form the essential part of the present invention. Hence, no further explanation of it will be given. An example of the auxiliary deflection means 100 is shown in FIGS. 5a and 5b. In FIG. 5a, an auxiliary deflection means 101, a convergence magnetic device 102 and a deflection coil 103 are mounted to a CRT 104. The auxiliary deflection means 101 is comprised of a coil device. When current flows through the coil, a magnetic field is developed in a horizontal scanning direction to deflect an electron beam in a vertical scanning direction. FIG. 5b shows an arrangement in which auxiliary deflection means 105 and 106 comprised of electrostatic deflection electrodes are assembled into a CRT 107, and in the figure an electron gun portion is omitted. When voltage is applied to between the auxiliary deflection means 105 and 106, an electric field in a vertical scanning direction is developed to deflect the electron beam in a vertical scanning direction. Accordingly, when the drive circuit 90 drives the auxiliary deflection means 100 with a rectangular wave current (or voltage), in synchronism with a period of the rectangular wave current (voltage) the electron beam is deflected in a vertical scanning direction proportional to the magnitude of the rectangular current (voltage) and in accordance with the polarity of the rectangular wave current (voltage). Though not shown, the auxiliary deflection means 100 may be arranged such that a coil is assembled into a deflection coil.

A state of the scanning lines on the screen in this case will be described referring to FIGS. 6 and 7. Numerals in the drawings designate the numbers of the scanning lines. The scanning lines belonging to even fields and those belonging to odd fields are distinctively depicted by continuous lines and broken lines, respectively. Reference symbols (A), (B), . . . , in the drawing designate signals corresponding to the respective scanning lines of the NTSC system, which are television signals of the standard television system. The signals in the even fields are distinguished those in the odd fields by attaching primes to the latter symbols.

Figure 6A:
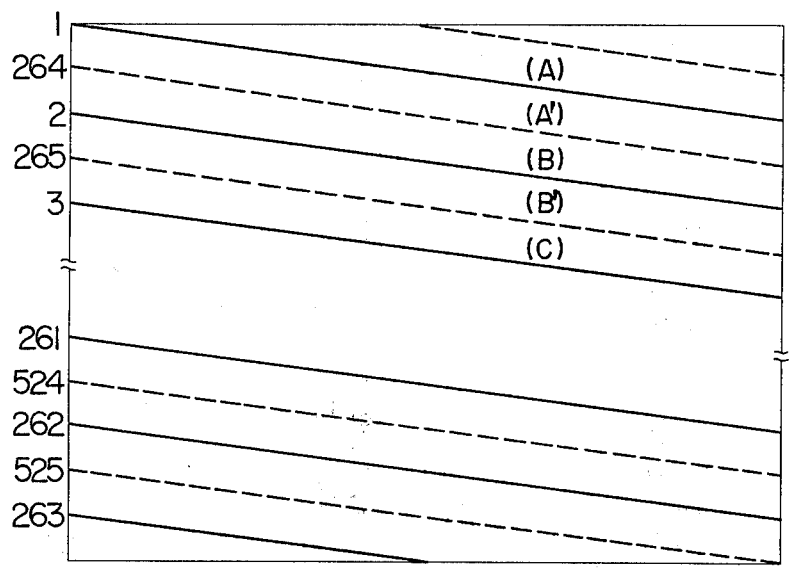
FIGS. 6a, 6b, 7a and 7b schematically show signals and scanning lines on a screen of a CRT, useful in explaining the operation of the auxiliary deflection means and a drive circuit shown in FIG. 1.
Figure 6B:
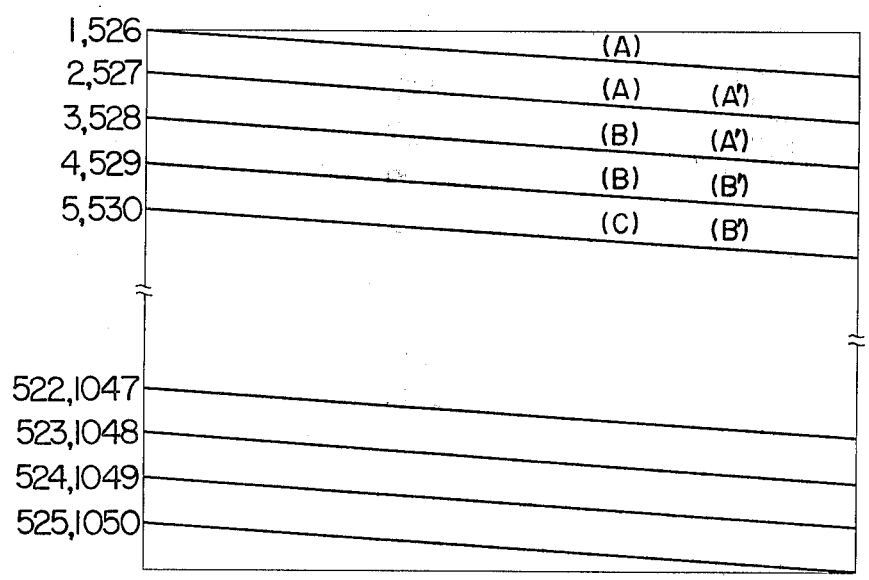
Figure 7A:
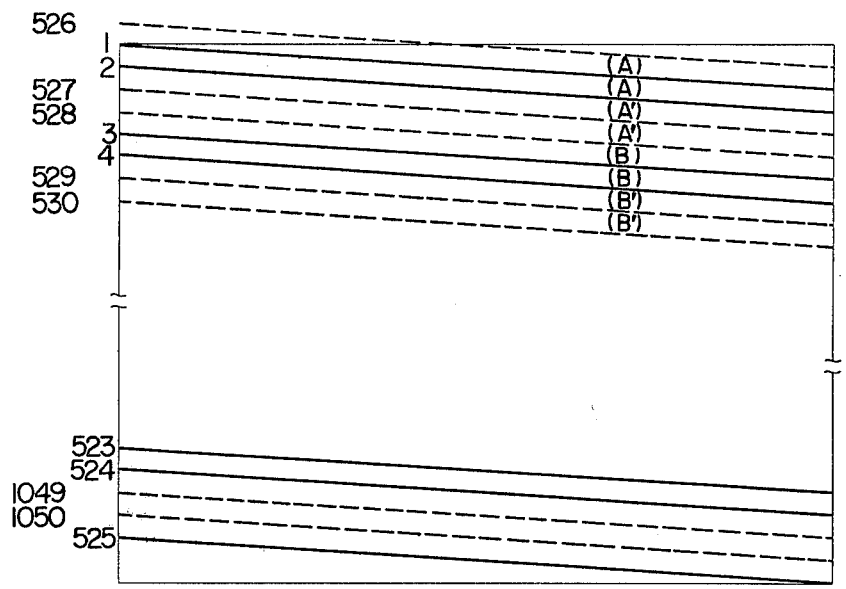
Figure 7B:
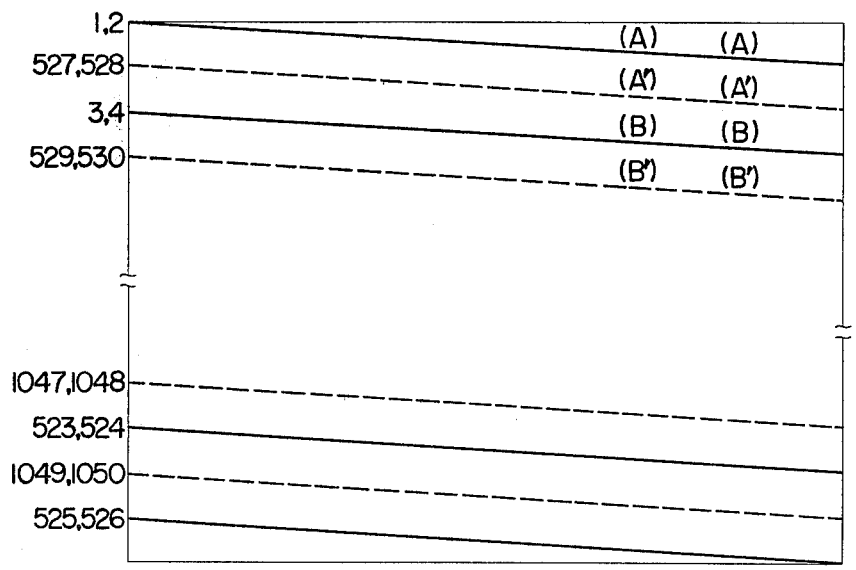

FIG. 6a illustrates the relationship between scanning lines and signals when the signals of the NTSC system are displayed by a usual television receiver. FIG. 6b illustrates the relationship between the scanning lines and signals when the signals of the NTSC system are applied to the input terminal 10, in case where the drive circuit 90 and the auxiliary deflection means 100 are not used in the embodiment in FIG. 1. In the case of FIG. 6b, the frequency of the horizontal scanning is doubled, so that the number of the scanning lines is 1050. Since the number of the scanning lines is an even number, however, an interlace scanning is not performed, and hence the scanning lines of the even fields and those of the odd fields are superposed. Also, the arrangement of the signals, as will be clear, is such that the signals of the NTSC system are not exactly reproduced, as seen when comparing with FIG. 6a. This state, however, raises no particular problem. Nevertheless, an exact reproduction of the signals of the original NTSC system may be realized by means of a combination of the drive circuit 90 and the auxiliary deflection means 100. The realization of this is illustrated in FIGS. 7a and 7b. In FIG. 7a, a scanning line of the 2k th (k is an integer of one or more) of FIG. 6b is located at a midpoint between its original position and a position of the (2k-1) th scanning line. This is realized by the drive circuit 90 which responds to the signal shown in FIG. 4(e) to drive the auxiliary deflection means 100. In more specifically, the polarity of the signal shown in FIG. 4(e) is so selected that a signal portion corresponding to the 2k th scanning line provides a deflection direction opposite to the vertical scanning direction. Further, a magnitude of the signal supplied to the auxiliary deflection means 100 by the drive circuit 90 is set to a value capable of moving the scanning line by a ½ distance of the scanning line interval of FIG. 6b by means of the drive circuit 90. As a result, the number of the scanning lines are doubled compared to that of the original signal, so that an apparent resolution is improved and the arrangement of the signals allows a display of the exact arrangement of the original signals. While the above explanation is made to the method that the 2k th (i.e. 2k-th) scanning line is made to approach to the (2k-1) th scanning line by the half distance of the scanning line interval, the same effect may of course be attained by moving the (2k-1) th scanning line toward the 2k th scanning line. The same thing is true in the case that the (2k-1) th scanning line is moved toward the 2k th scanning line and the 2k th scanning line is moved toward the (2k-1) th scanning line respectively by a ¼ distance of the original scanning line interval.

In FIG. 7b, the (n−1) number of scanning lines succeeding to the (n×k−(n−1)) th scanning line are superposed on the (n×k−(n−1)) th one. In the case of the figure 7b, n=2. Therefore, the 2k th scanning line succeeding to the (2k-1) th scanning line is superposed upon the latter. In other words, the 2k th scanning line succeeding to the (2k−1) th scanning line scans the same path scanned by the (2k−1) th scanning line by the same signal. For realizing this, the polarity of the signal of FIG. 4(e) is selected so that a signal portion corresponding to the 2k th sanning line provides a deflection direction opposite to the vertical scanning line, and a magnitude of the signal supplied to the auxiliary deflection means 100 by the drive circuit 90 is set to a value capable of moving the scanning line by the distance of the scanning line interval shown in FIG. 6b, by means of the drive circuit 90. Through this process, the horizontal scanning frequency is doubled to thereby double the number of the scanning lines, however, the apparent number of the scanning lines and the apparent arrangement or distribution of the signals of FIG. 7b on the screen can be reproduced in exactly the same fashion with those of the original signals of the NTSC system shown in FIG. 6a.

Let us return to FIG. 1. In the description thus far made, the television signal of the standard television system supplied to the input terminal 10 is signal-converted and supplied to the CRT, and in displaying the signal, the scanning is made at the doubled horizontal scanning frequency. In this condition, the switches 130, 150 and 160 are connected in the state as illustrated.

Explanation to follow is the operation of the television receiver when it receives a video signal of the second television system proposed by NHK in which the number of horizontal scanning lines is 1125, the horizontal scanning frequency is 33.75 KHz, and the vertical scanning frequency is 60 Hz. In this case, switches 130, 150 and 160 are switched-over to the positions located on the opposite side to those above-mentioned. A demodulator circuit 120, like the demodulator circuit 20, demodulates a video signal of the second television system supplied to the input terminal 110 into signals of three primary colors (the R, G and B signals in FIG. 1). The signals demodulated by the demodulator 120 are applied to the video output circuit 40, through the switch 130.

A sync signal obtained by the demodulator circuit 120 is supplied to a sync separation circuit 140 which in turn separates a vertical sync signal and a horizontal sync signal from the supplied sync signal, as in the case of the sync separation circuit 50. The vertical sync signal is supplied to the vertical deflection circuit 60 through the switch 150. The vertical deflection circuit 60 is so designed as to operate at 60 Hz in a black-and-white receiving mode and at 59.94 Hz in a color receiving mode with respect to a usual standard TV signal system. Therefore, it can smoothly operate when receiving the signal of the second television system.

Figure 13:
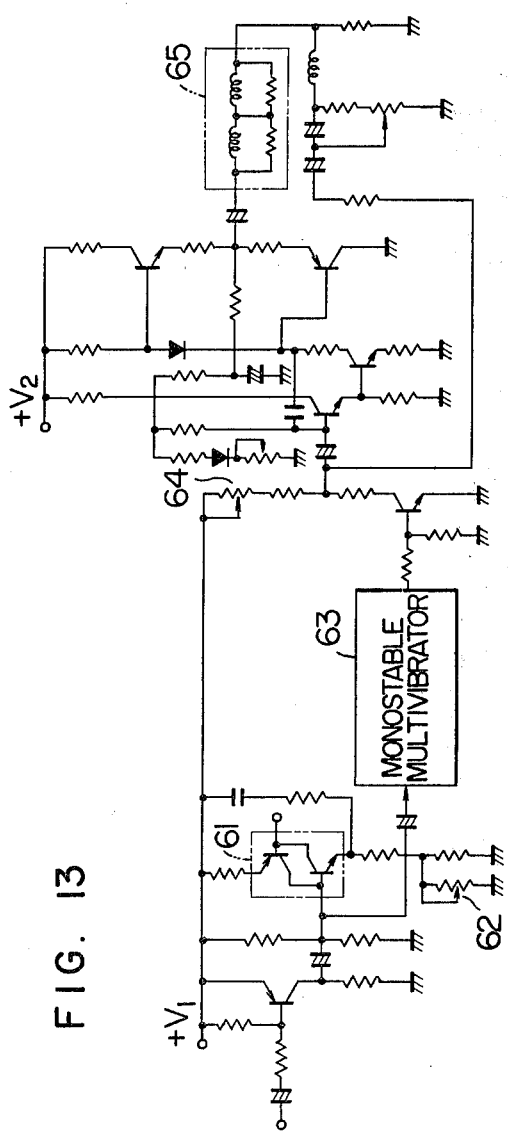
FIG. 13 shows a circuit diagram of a vertical deflection circuit 60.

An example of the vertical deflection circuit 60 is shown in FIG. 13. The circuit is a well known vertical deflection circuit and operates at 60 Hz in a black-and-white TV signal receiving mode and at 59.94 Hz in a color TV signal receiving mode. In the figure, reference numeral 61 designates a thyristor for the vertical oscillation, 62 a vertical sync variable resister, 63 a multivibrator for setting the width of the vertical pulse to a proper value, 64 a variable resistor for adjusting the vertical amplitude, 65 a vertical deflection coil.

The horizontal sync signal is supplied through the switch 160 to the horizontal deflection circuit 80. The horizontal scanning frequency of the NTSC system is 15.734 KHz in color broadcasting mode and 15.75 KHz in a black-and-white broadcasting mode. Accordingly, the frequency of the horizontal sync signal obtained by the PLL circuit 70 is given by $$15.734 (\text{or } 15.75) \times 2 = 31.468 (\text{or } 31.5) \text{KHz}.$$

The frequency of the horizontal sync signal obtained by the sync separation circuit 140 is 33.75 KHz and the difference between it and the frequency of the horizontal sync signal obtained by the PLL circuit 70 is $$33.75 - 31.468 = 2.282 \text{ KHz}.$$

The frequency difference in this degree allows the television set to normally operate without switching-over or changing the high potential circuit constants at high potential portions contained in the horizontal deflection circuit 80, such as known resonance capacitor, the linearity coil and the S distortion correcting capacitor. If a synchronizing pull-in range of the AFC circuit in the horizontal deflection circuit 80 is set larger than the above frequency difference, the television set can receive signals of both the systems without switching-over the circuit constants in the AFC ciircuit.

In this case, it is preferable that a free-run frequency of the horizontal deflection circuit 80 (a free oscillation frequency when no sync signal is supplied) is set at a midvalue between the horizontal scanning frequencies of the standard and the second television systems.

Figure 14:
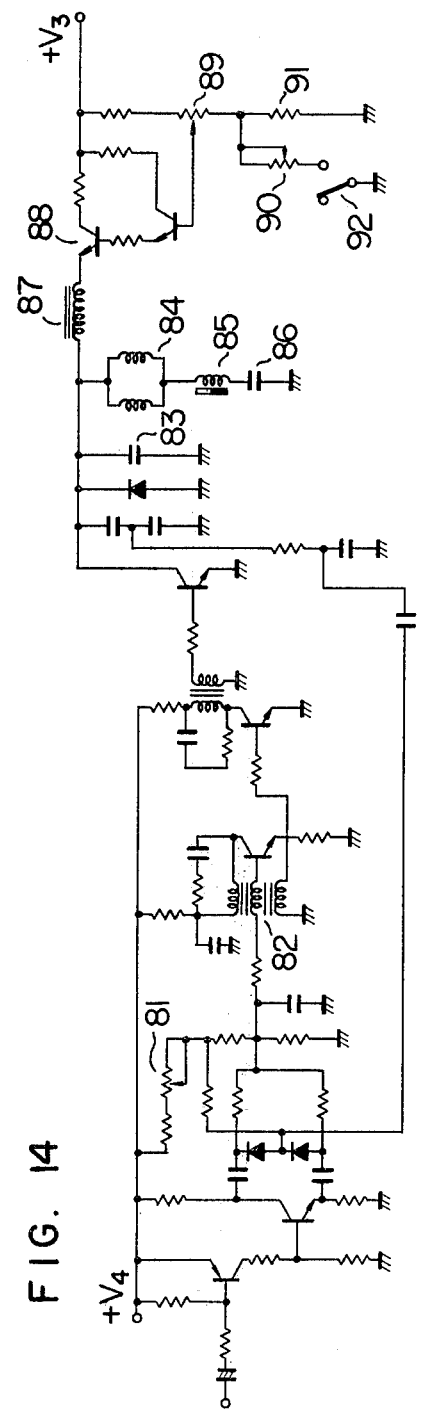
FIG. 14 shows a circuit diagram of a horizontal deflection circuit 80.

An example of the horizontal deflection circuit 80 is shown in FIG. 14. The AFC circuit is comprised of a usual double-pulse type AFC circuit, and the horizontal synchronization is adjusted by a horizontal sync variable resistor 81. The pull-in range of the AFC is adjusted by changing the slope of a reference sawtooth wave or the pulse width, as well known. Reference numeral 82 is an oscillation transformer and the free oscillation frequency is set at any proper value by adjusting the core of the transformer. Reference numeral 83 designates a resonance capacitor; 84 a horizontal deflection coil; 85 a linearity coil; and 86 an S distortion correcting coil. Reference numeral 88 indicates a transistor for controlling a voltage applied to a horizontal transformer 87. The voltage is set at a proper value by means of a variable resistor 89. The variable resistor 89 adjusts the horizontal signal amplitude. In order to secure a fixed picture amplitude for both the first and second television systems, a variable resistor 90 is connected in parallel with a resistor 91 by means of a relay (only its contact 92 is illustrated), thereby setting the voltage applied to the horizontal transformer 87 to an optimum value.

In the above-mentioned way, the television signals of the standard and second television systems can be visually reproduced without switching-over the high potential circuit constants by means of a relay or switch etc.

Figure 8:
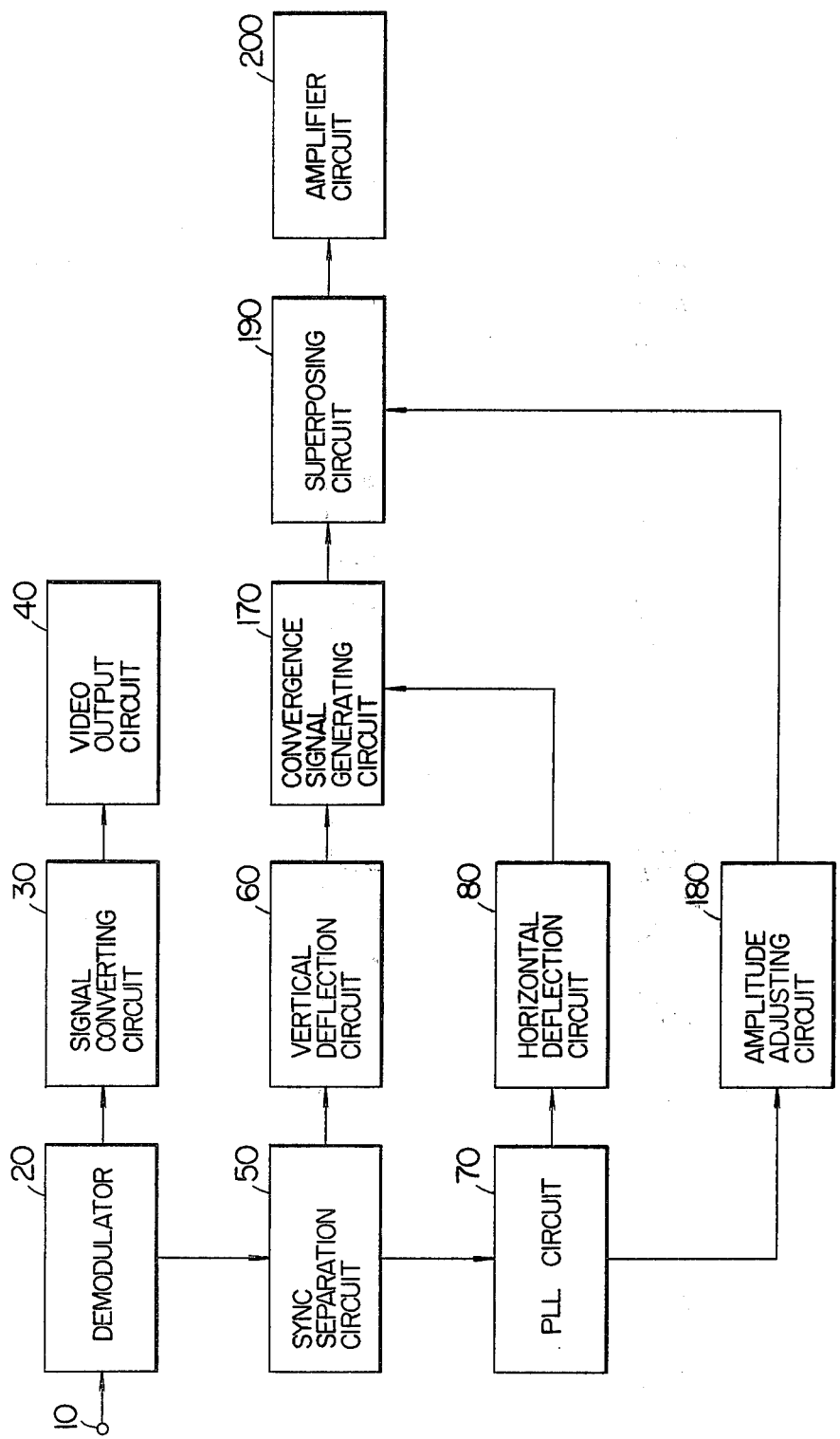
FIG. 8 is a block diagram of another embodiment of a television receiver according to the present invention.

Turning now to FIG. 8, there is shown a block diagram of another embodiment of a television receiver according to the present invention. In FIG. 8, the portion for receiving the signals of the second television system and the changeover switches are omitted. The blocks with the same functions as in FIG. 1 are designated by like reference numerals. A different point of the embodiment of FIG. 8 from the FIG. 1 embodiment resides in that the function of a combination of the drive circuit 90 and the auxiliary deflection means 100 is executed by a rectangular wave superposed on the convergence signal. A convergence signal generating circuit 170 produces a signal for the convergence adjustment in a conventional TV receiver set on the basis of the signals obtained from the vertical deflection circuit 60 and the horizontal deflection circuit 80. The amplitude adjusting circuit 180 adjusts an amplitude of a rectangular wave with a duty ratio of 50% shown in FIG. 4(e) obtained by the PLL circuit 70 and then applies it to a superposing circuit 190. The superposing circuit 190 superposes the rectangular wave obtained by the amplitude adjusting circuit 180, on a signal for the correction of misconvergence in the vertical deflection direction, which is one of the signals obtained by the convergence signal generating circuit 170. The output of the superposing circuit 190 is amplified by the amplifier circuit 200 and used for driving the convergence coil (not shown). As a result, the signal obtained by the convergence signal generating circuit 170 corrects a misconvergence in the picture, as well known. As easily seen, the signal obtained by the amplitude adjusting circuit 180 executes the same function as that of the combination of the drive circuit 90 and the auxiliary deflection means 100. In other words, an arrangement or distribution of the scanning lines and the signals, as shown in FIGS. 7a and 7b, may be adjusted by changing the amplitude of the rectangular wave shown in FIG. 4(e) by the amplitude adjusting circuit 180. The same function can be attained by a modified arrangement such that the convergence signal generating circuit 170 and the amplitude adjusting circuit 180 are digitally constructed, the superposing circuit 190 is modified for the signal adding or summing operation, the amplifier circuit 200 is modified for the D/A conversion and amplifying and an output signal from the amplifier is used for the convergence coil.

Figure 9:
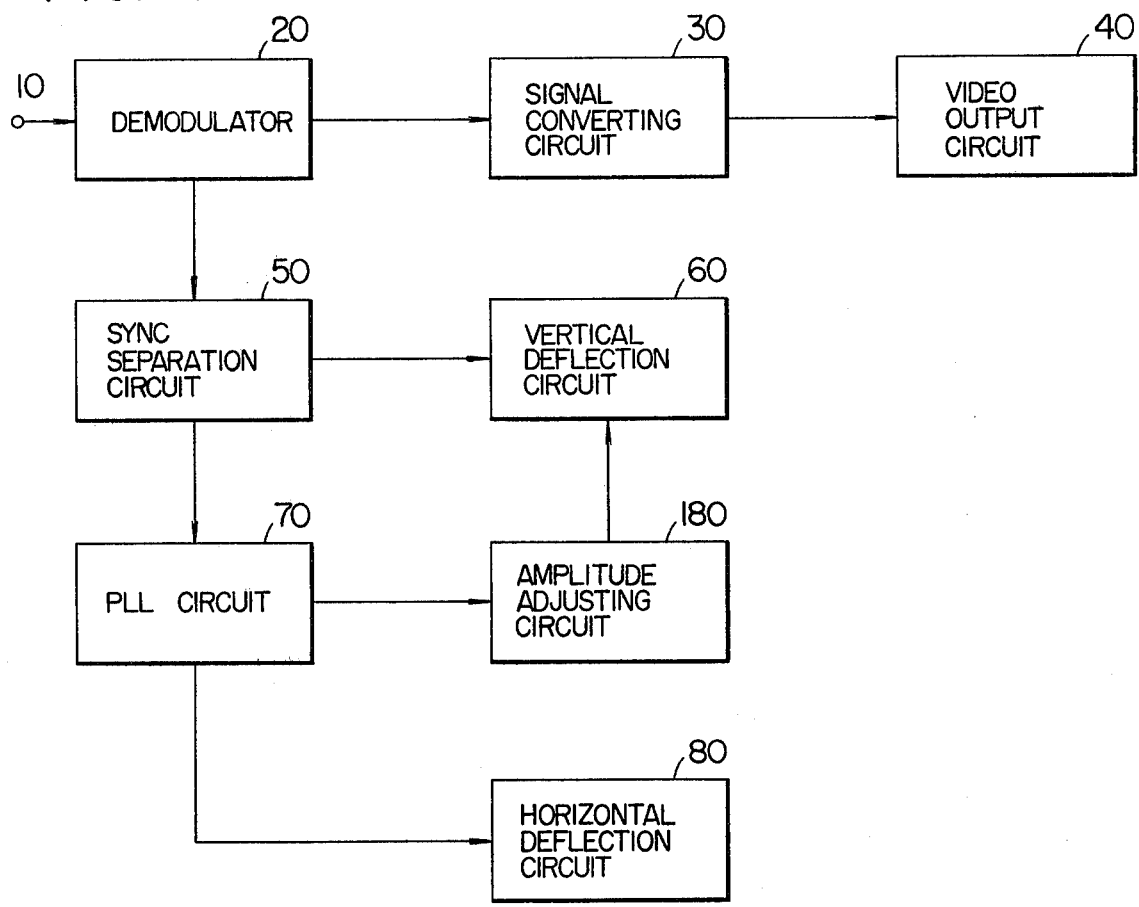
FIG. 9 is a block diagram of yet another embodiment of a television receiver according to the present invention.

FIG. 9 shows a block diagram of another embodiment of a television receiver according to the present invention. In FIG. 9, the portion for receiving the television signal of the second television system and the changeover switches are omitted. Further, the blocks with the same functions as those in FIG. 1 are designated by like numerals. A different point of the embodiment of FIG. 9 from the embodiment of FIG. 1 is that the function of the combination of the drive circuit 90 and the auxiliary deflection means 100 in FIG. 1 is executed by a rectangular wave superposed on a vertical deflection signal of the vertical defleciton circuit 60. More specifically, an amplitude of a rectangular wave of the duty ratio 50% shown in FIG. 4(e) obtained by the PLL circuit 70 is adjusted and supplied to the vertical deflection circuit 60, and then is superposed on the vertical deflection signal. The arrangement of the scanning lines and the signals as shown in FIGS. 7a and 7b can be adjusted by adjusting the amplitude of the rectangular wave to be superposed on the vertical deflection signal, shown in FIG. 4(e).

FIG. 10 shows a block diagram of another embodiment of a television receiver according to the present invention. In the figure, like numerals are used for designating like blocks in FIG. 1. A different point of the present embodiment from the embodiment in FIG. 1 resides in a signal converting circuit 210 and a luminance setting circuit, and no provision of the drive circuit and the auxiliary deflection means.

The operation of the signal converting circuit 210 will be described referring to FIG. 11. A waveform in FIG. 11(a) is that of one of the signals obtained by the demodulator 20, and this signal is applied to the signal converting circuit 210. The signal converting circuit 210 includes two memories and operates as shown in FIGS. 11(b) and 11(c). As shown, when one memory is in a write mode, the other memory is in a read out mode. Those operation modes are inverted every horizontal scanning period of the television signal of the standard television system. The signal written is read out once at a speed two times the writing speed, in the first half of the next one horizontal scanning period. Accordingly, a signal of FIG. 11(d) is read out from the memory operating as shown in FIG. 11(b) and a signal of FIG. 11(e) is read out from the memory operating as shown in FIG. 11(c). A signal shown in FIG. 11(f), as the sum of the signals of FIGS. 11(d) and 11(e), is supplied, as an output signal from the signal converting circuit 210, to the luminance setting circuit 220.

The signal FIG. 11(f) supplied from the signal converting circuit 210 to the luminance setting circuit 220 exists only for ½ (1/n) period of one horizontal period of the standard television system, when compared to the original signal of FIG. 11(a). Accordingly, an average luminance in the picture when the television signal of the standard television system is displayed and that when the television signal of the second television system are related by 1:2 (1:n). In order to make the average luminances for both the television systems equal to each other, amplitudes of the signals supplied to the video output circuit 40, therefore, must be related by a ratio of about 2:1 (n:1) by means of the luminance setting circuit.

Figure 12:
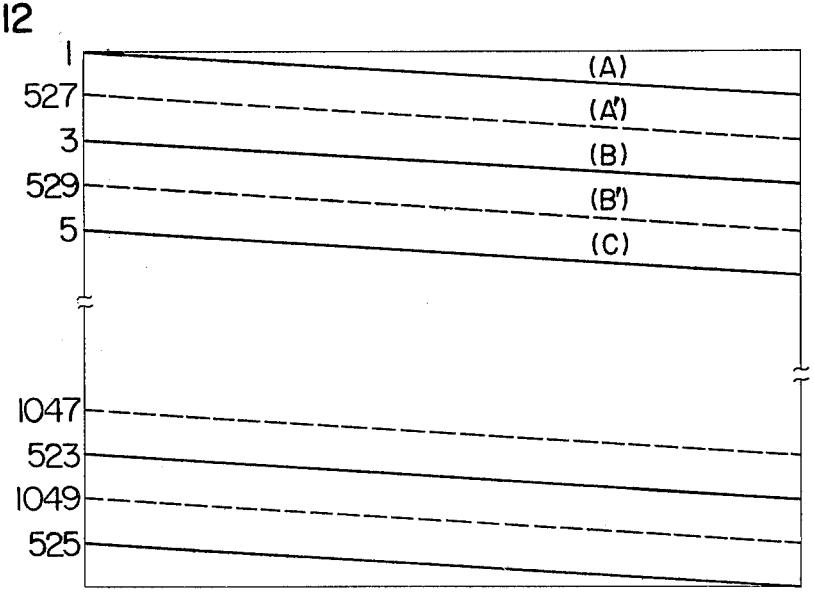
FIG. 12 is a schematic diagram showing an arrangement of signals and scanning lines on the screen, which is realized by the embodiment shown in FIG. 10.

FIG. 12 illustrates that an interlace relation of the origianl signals can be exactly reproduced when the televison signal of the standard television system is displayed by the embodiment of FIG. 10.

In FIG. 12, scanning lines in an odd field is indicated by continuous lines and scanning lines in an even field by broken lines. Symbols (A) and (B) designate signals corresponding to scanning lines of the television signals in the standard television system shown in FIG. 6a. The reason why no even number th scanning lines are illustrated is that the portions in the picture corresponding to the even number th scanning lines have no signals, as shown in FIG. 11(f). As seen from the figures, even if the drive circuit 90 and the auxiliary deflection means 100 as shown in FIG. 1 are not used, the original television signals of the standard television system can correctly be reproduced free from the superposition and irregularly interlacing of the odd and even fields, as shown in FIG. 6b. In the case of FIGS. 11 and 12, the read out operation is made in the first half of the horizontal scanning period so that a signal is read out from the memory at the time of the odd scanning lines, and no signal is provided at the time of the even scanning lines. Alternatively, if the read out operation is made in the latter half of the horizontal scanning period, the signals corresponding to the even and odd scanning lines are made in the reverse relation. In the case, when the odd scanning lines appear, no signal is provided.

As described above, the television signal of the standard televison signal is converted into a signal with an n times horizontal frequency. When receiving the television signal of the standard television system, the horizontal deflection circuit operates at the n times horizontal scanning frequency. When receiving the television signal of the second television system, it operates at the horizontal scanning frequency of the second television system. Accordingly, there is no need for switching the high potential circuit constants in the deflection circuit. The memory capacity needs memories only for two lines. Therefore, a television receiver with good reliability and a simple construction can be realized.

Further, the television set according to the present invention has a function to move in the vertical scanning direction the scanning lines at the horizontal scanning period of the standard television system and to adjust the scanning line interval properly. Accordingly, it can display a picture with a correct arrangement of the scanning lines and the signals.

We claim:

1. A television receiver comprising:
   first demodulating circuit means for demoduating an applied video signal of a standard television system into signals containing primary color information;
   first sync separation circuit means for separting a first horizontal synchronizing signal and a vertical synchronizing signal from said video signal of a standard television system;
   PLL circuit means for receiving said first horizontal synchronizing signal and forming a second horizontal synchronizing signal having a frequency n times that of the first horizontal synchronizing signal where $n \geq 2$;
   signal converting means for converting said demodulated signals into signals having a time base compressed to 1/n of that of said demodulated signals so as to correspond to the second horizontal synchronizing signal;
   second demodulating circuit means for demodulating an applied video signal of a second television system into signals containing primary color information, said second television system ulitizing a horizontal synchronizing signal having a frequency about n times that of the standard television system;
   second sync separation circuit means for separating a horizontal synchronizing signal and a vertical synchronizing signal from said video signal of said second television system;
   vertical deflection circuit means for driving a vertical deflection coil;
   first switch means for supplying the vertical synchronizing signal separated in said first sync separation circuit means to said vertical deflection circuit means when said television receiver is to display the video signal of a standard television system and for supplying the vertical synchronizing signal separated in said second sync separation circuit means to said vertical deflection circuit means when said television receiver is to display the video signal of said second television system;

horizontal deflection circuit means which drives a horizontal coil;

second switch means for supplying said second horizontal synchronizing signal to said horizontal deflection circuit means when said television receiver is to display the video signal of said standard television system and for supplying the horizontal synchronizing signal separated in said second sync separation circuit means to said horizontal deflection means when said television receiver is to display the video signal of said second television system;

video output circuit means for amplifying signals supplied from a third switch means and for driving a cathode ray tube; and third switch means for selectively supplying the signals converted in said signal converting means to said video output circuit means when said television receiver is to display said video signal of said standard television system and for supplying the signals demodulated in said second demodulating circuit means to said video output circuit means when said television receiver is to display said video signal of said second television system.

2. A television receiver according to claim 1, in which said horizontal deflection circuit means includes an oscillating circuit of which the free oscillating frequency is set at a midvalue between n times the frequency of the horizontal scanning frequency of the standard television system and the horizontal scanning frequency of the second television system.

3. A television receiver according to claim 1, in which said horizontal deflection circuit means includes an AFC circuit with a pull-in frequency range larger than an absolute value of a difference between n times the frequency of the horizontal scanning frequency of the standard television system and the horizontal scanning frequency of the second television system.

4. A television receiver according to claim 1, further comprising:

auxiliary deflection means mounted to a neck portion of a cathode ray tube; means for generating a rectangular wave synchronized with said television signal; and drive circuit means for amplifying said rectangular wave signal and supplying the amplified signal to said auxiliary deflection means and adjusting properly intervals between the scanning lines displayed by adjusting an amplitude of said rectangular wave supplied to said auxiliary deflection means by said drive cirucit means when the horizontal scanning frequency is converted into an n times frequency.

5. A television receiver according to claim 1, further comprising:

auxiliary deflection means mounted to a neck portion of a cathode ray tube; means for generating a rectangular wave synchronized with said first horizontal synchronizing signal; and drive circuit means for amplifying said rectangular wave signal and supplying the amplified signal to said auxiliary deflection means and adjusting properly intervals between the scanning lines displayed by adjusting an amplitude of said rectangular wave supplied to said auxiliary deflection means by said drive circuit means.

6. A television receiver according to claim 4, in which said auxiliary deflection means includes an electrostatic deflection electrode means.

7. A television receiver according to claim 1, further comprising: means for generating a rectangular wave signal synchronized with said first horizontal synchronizing signal; amplitude adjusting circuit means for adjusting an amplitude of said rectangular wave signal and superposing circuit means for superposing an output signal from said amplitude adjusting circuit means on a convergence signal; wherein intervals between the horizontal scanning lines displayed are properly adjusted by adjusting an amplitude of the rectangular wave synchronized with said first horizontal synchronizing signal to be superposed on said convergence signal by means of said amplitude adjusting circuit means when said horizontal deflection circuit receives a video signal of the standard television system and operates at a frequency n times that of the horizontal synchronizing frequency of the standard television system.

8. A television receiver according to claim 7, in which said convergence signal and said signal synchronized with said television signal are digital signals.

9. A television receiver according to claim 1, further comprising: means for generating a rectangular wave signal synchronized with said first horizontal synchronizing signal; means for generating a vertical deflection signal; and means for superposing said rectangular wave signal on the vertical deflection signal, wherein the amplitude of said rectangular wave signal in adjusted so that the (n−1) number of scanning lines succeeding to the (n×k−(n−1))th scanning line (k≧1) are superposed onto the signal.

10. A television receiver according to claim 1, in which said signal converting means performs signal conversion by storing in a memory a signal of one horizontal period of the video signal of the standard television system over a duration of one horizontal period and by reading out once the signal stored at a speed n times that with which it is stored, and said receiver further comprises a luminance setting circuit for setting the luminance of a reproduced picture so that luminance of a picture reproduced from a video signal of the standard television system is substantially equal to that reproduced from a video signal of the second television system.

* * * * *